US008522895B1

(12) United States Patent
Honsa

(10) Patent No.: US 8,522,895 B1
(45) Date of Patent: Sep. 3, 2013

(54) POWER TOOL

(76) Inventor: Thomas W. Honsa, Milan, IL (US)

( * ) Notice: Subject to any disclaimer, the term of this patent is extended or adjusted under 35 U.S.C. 154(b) by 728 days.

(21) Appl. No.: 12/202,196

(22) Filed: Aug. 29, 2008

Related U.S. Application Data

(60) Provisional application No. 60/966,609, filed on Aug. 29, 2007.

(51) Int. Cl.
*B23B 47/08* (2006.01)

(52) U.S. Cl.
USPC .......................................... 173/170; 173/169

(58) Field of Classification Search
USPC ................ 173/31, 90, 19, 169, 186, 170, 36, 173/221
See application file for complete search history.

(56) References Cited

U.S. PATENT DOCUMENTS

| | | | | | |
|---|---|---|---|---|---|
| 1,298,504 | A | * | 3/1919 | Hollingshead | 81/475 |
| 2,382,591 | A | * | 8/1945 | Warren | 173/221 |
| 2,788,768 | A | * | 4/1957 | Fischer | 91/317 |
| 2,813,517 | A | * | 11/1957 | Sedwick | 173/221 |
| 3,060,894 | A | * | 10/1962 | Auksmann et al. | 173/133 |
| 3,133,600 | A | * | 5/1964 | Hochreuter | 173/75 |
| 3,241,622 | A | * | 3/1966 | Nordahl et al. | 173/18 |
| 3,446,294 | A | * | 5/1969 | Bailey et al. | 173/138 |
| 3,934,657 | A | * | 1/1976 | Danielson | 173/169 |
| 3,939,925 | A | * | 2/1976 | Danielson | 173/170 |
| 4,330,967 | A | * | 5/1982 | Richardson | 451/451 |
| 4,905,772 | A | * | 3/1990 | Honsa et al. | 173/162.1 |
| 6,814,156 | B2 | * | 11/2004 | Dieterle et al. | 173/170 |
| 6,889,591 | B2 | * | 5/2005 | Sabates et al. | 89/1.14 |

* cited by examiner

*Primary Examiner* — Alexandra Elve
*Assistant Examiner* — Nathaniel Chukwurah
(74) *Attorney, Agent, or Firm* — Hamilton IP Law, PC; Jay R. Hamilton; Charles A. Damschen

(57) ABSTRACT

A power tool is disclosed. The power tool generally includes a tool body and an internal portion positioned within the tool body. A work piece is operatively coupled to the internal portion. Two handles are positioned on the tool body adjacent the work piece to provide for increased accuracy and comfort for the user during operation of the power tool. The power tool may be engaged with a plurality of work pieces to achieve different results depending on the embodiment of the power tool. The power tool may either be pneumatically or electrically powered, and may be of varying sizes and configurations. A throttle lever adapted to allow the user to control the speed of the internal portion is positioned on one of the handles.

11 Claims, 10 Drawing Sheets

POWER TOOL

CROSS REFERENCE TO RELATED APPLICATIONS

This application claims the benefit under 35 U.S.C. §119 (e) of U.S. Provisional Application No. 60/966,609 filed Aug. 29, 2007, which is incorporated by reference herein.

FIELD OF INVENTION

The present invention relates to an apparatus for reducing the vibrations that are transferred from a power tool to the user for ergonomically improved positioning in relation to the user for stress and injury reduction.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

Figure 1:
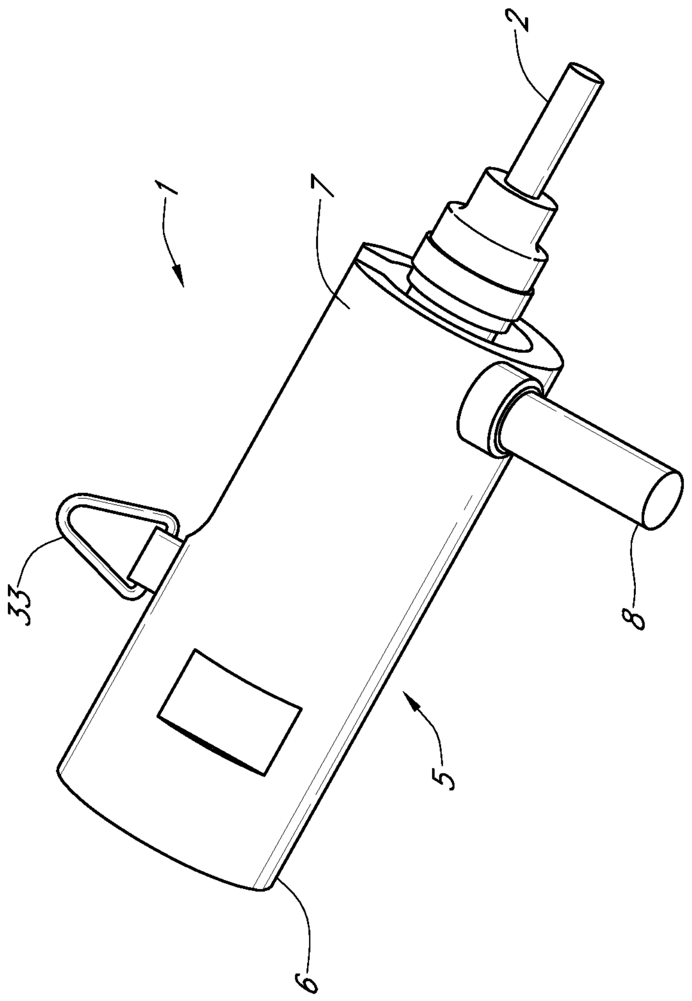
FIG. 1 provides a perspective view of an exemplary embodiment of the power tool.
Figure 2:
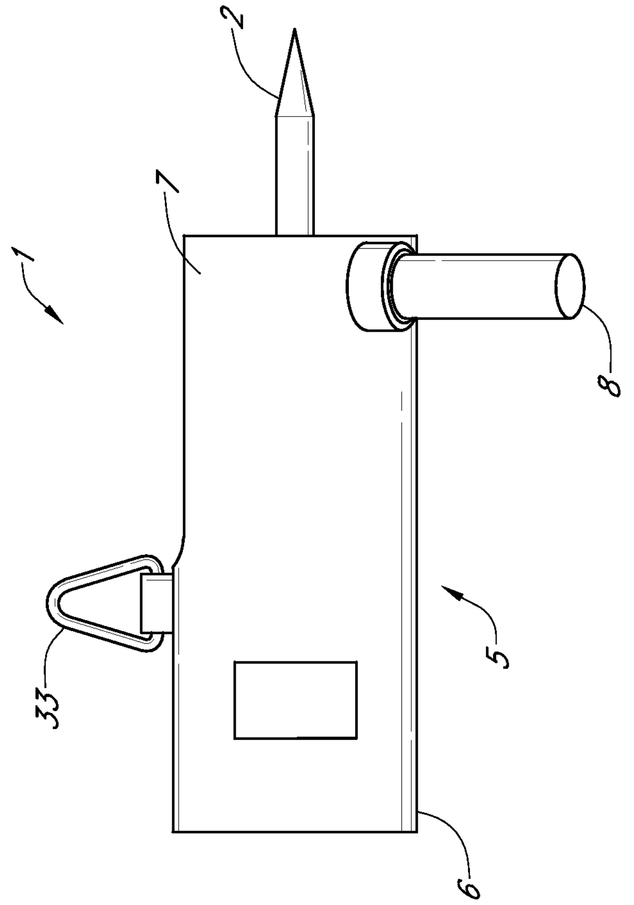
FIG. 2 provides a side view of the exemplary embodiment of the power tool.
Figure 3:
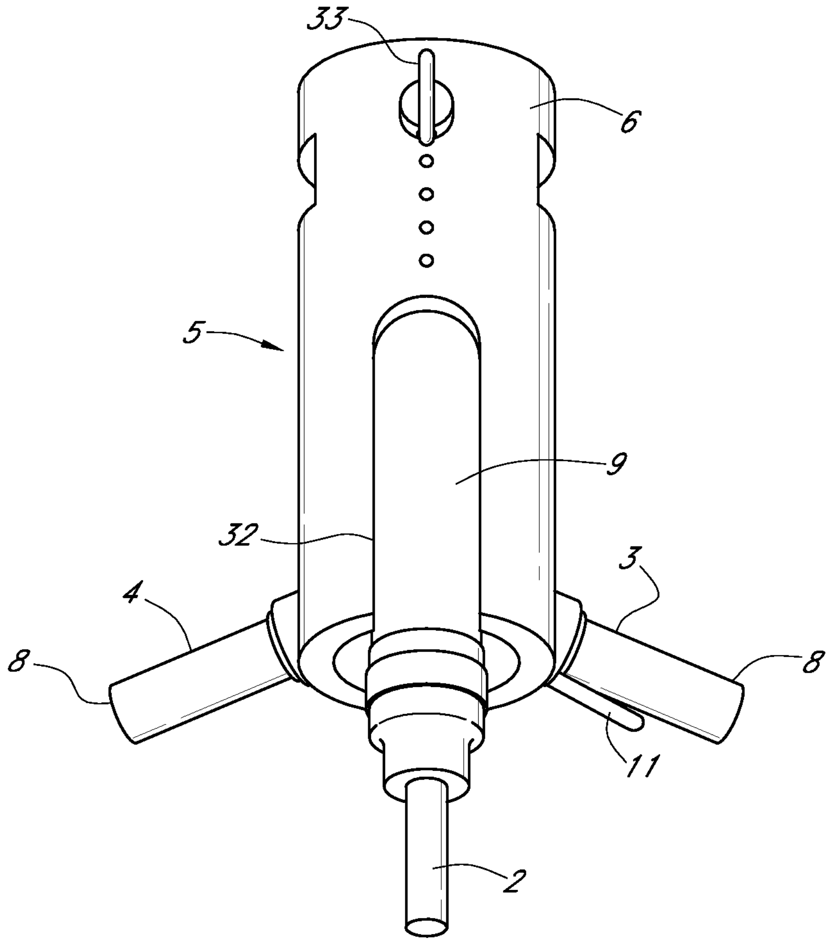
FIG. 3 provides a front view of the exemplary embodiment of the power tool.

Many types of reciprocating power tools are presently available. However, most such power tools, such as those disclosed in U.S. Pat. No. 6,705,409, include one handle opposite the end of the power tool to which the work piece is connected. This configuration is undesirable for several reasons. First, when the user's wrist, elbow, and/or shoulder are positioned at an extreme angle as the prior art orientations require, the force transferred to the user from the power tool is not evenly disbursed to the user. To properly position the work piece of the prior art power tool, the user's hand must be positioned in close proximity to the user's shoulder with the user's elbow positioned behind the user's chest. This position is similar to the position of those anatomical structures if the user were lying face down with the user's hands placed flat against the floor approximately shoulder-width apart.

If the user's wrist, elbow, and/or shoulder are positioned so that the user's wrist, elbow, and/or shoulder are at the limit of travel for the user's hand, nearly the entire force transferred from the power tool to the user's hand is subsequently transferred through the user's wrist, elbow, and shoulder to be dispersed by the user's body. When those anatomical structures are in the above-described position, the relevant tendons, ligaments, muscles, and other structures are substantially at the limit of travel and not able to absorb any further energy. Subsequently, when the entire force from the power tool 1 is transferred through those anatomical structures, the force will tend put an undue amount of stress onto those anatomical structures, often resulting in damage. The situation is analogous to placing an additional load on a spring that is already stretched to its limit; additional load either causes the spring to break or deforms and damages the spring so that it no longer performs properly. Placing the handles as shown in the prior art requires that the user bend the user's wrists, elbows, and shoulders to place the handle in close proximity to the user's chest to properly position the work piece and operate the power tool.

DETAILED DESCRIPTION - LISTING OF ELEMENTS

| ELEMENT DESCRIPTION | ELEMENT # |
|---|---|
| Power Tool | 1 |
| Work Piece | 2 |
| First Handle | 3 |
| Second Handle | 4 |
| Tool Body | 5 |
| Tool Body First End | 6 |
| Tool Body Second End | 7 |
| Handle Distal End | 8 |
| Internal Portion | 9 |
| User | 10 |
| Throttle lever | 11 |
| Receiver Cup | 12 |
| Clutch Band | 13 |
| Exhaust Shield | 14 |
| Valve Seat | 15 |
| Valve | 16 |
| Washer | 17 |
| Top Valve Seat | 18 |
| Piston | 19 |
| Pneumatic Motor | 20 |
| Retainer | 21 |
| User's Hands | 22 |
| Barrel | 23 |
| First Air Passage | 24 |
| Second Air Passage | 25 |
| Tool Feed | 26 |
| Throttle Valve | 27 |
| Air Inlet | 28 |
| Cavity | 30 |
| Pneumatic Percussive Mechanism | 31 |
| Sight Line | 32 |
| Support Ring | 33 |

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

DETAILED DESCRIPTION

Referring now to the drawings, wherein like reference numerals designate identical or corresponding parts throughout the several views, FIG. 1 provides a perspective view of an exemplary embodiment of the power tool 1. In the embodiments pictured herein, the present invention is applied to vibration-isolated power tools similar to those disclosed in U.S. Pat. Nos. 5,896,934, 6,705409, and 6,955,230, which patents are incorporated by reference herein. Most commonly, the power tool 1 will be what is generally referred to as either a chipping hammer or rivet buster. However, the present invention is not limited by the specific embodiments pictured or described herein and may be applied to tools other than those disclosed in the patents referenced herein.

Figure 4:
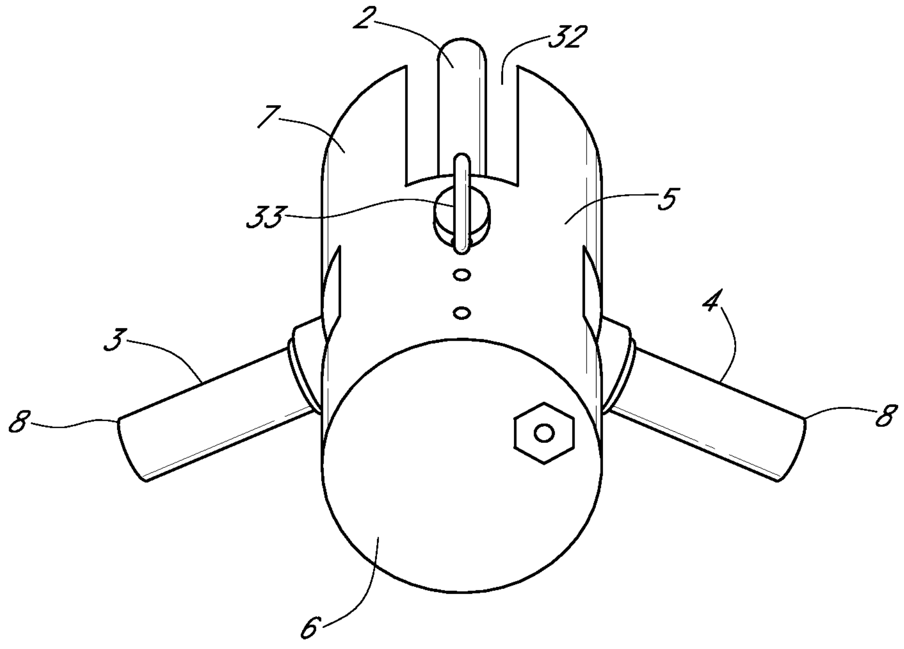
FIG. 4 provides a top view of the exemplary embodiment of the power tool.
Figure 5:
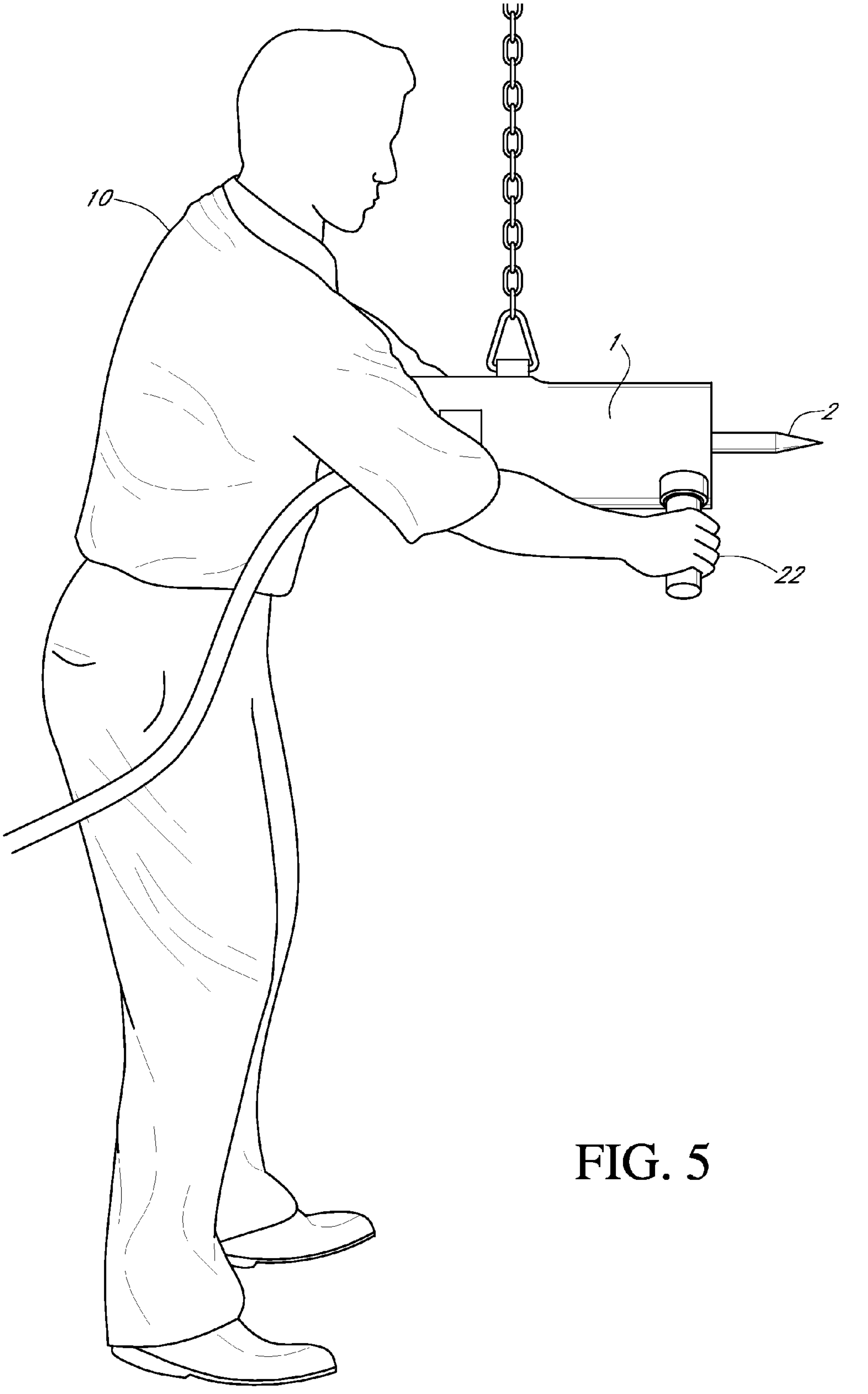
FIG. 5 provides a side view of the power tool in relation to a user during operation.
Figure 6:
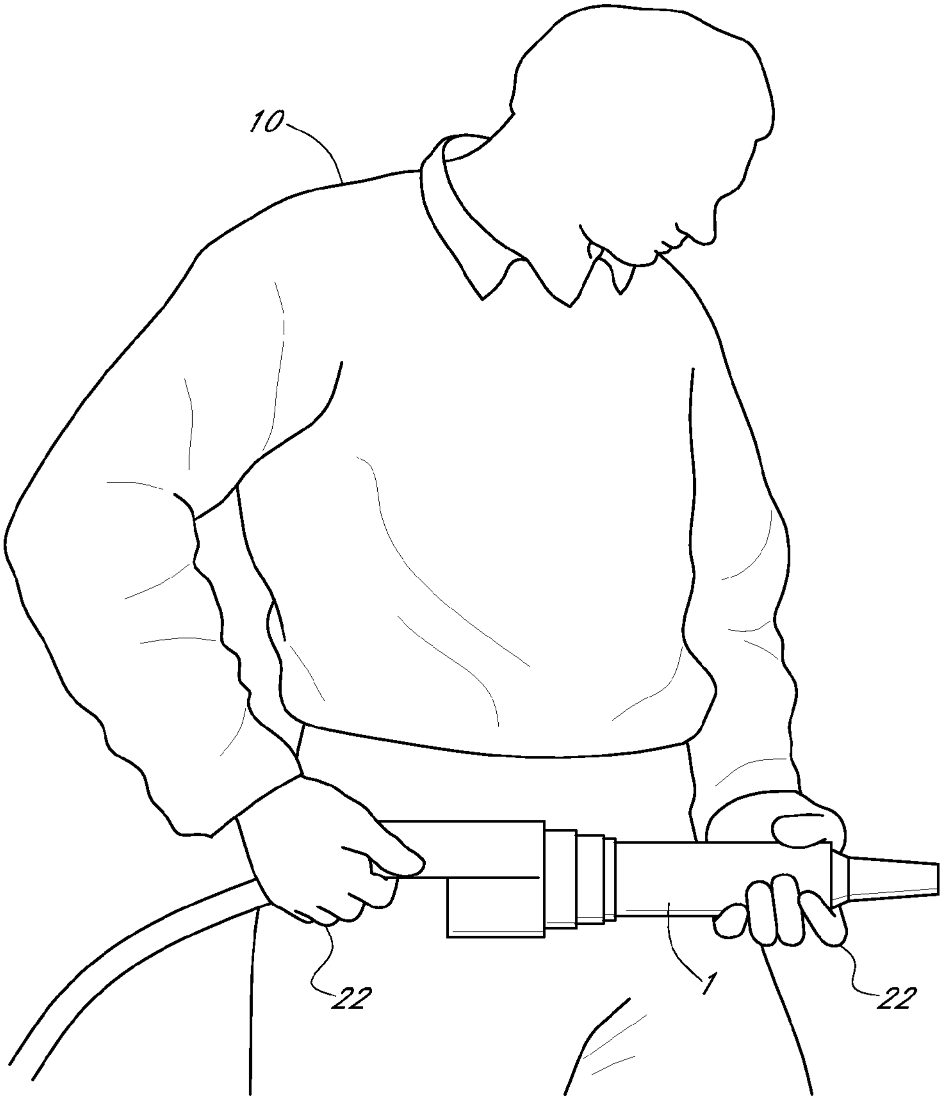
FIG. 6 provides a side view of the prior art tool in relation to a user during operation.

As disclosed herein, a tool body 5 houses the internal portion 9 of the power tool 1. The internal portion 9 and tool body 5 are configured so that the internal portion 9 fits within a cavity 30 formed in the tool body 5. The tool body 5 may also include a sight line 32, which is a cutaway portion of the tool body 5 along the longitudinal axis of the tool body 5 to allow the user 10 better visibility of the work surface, which is best shown in FIG. 4.

Figure 7:
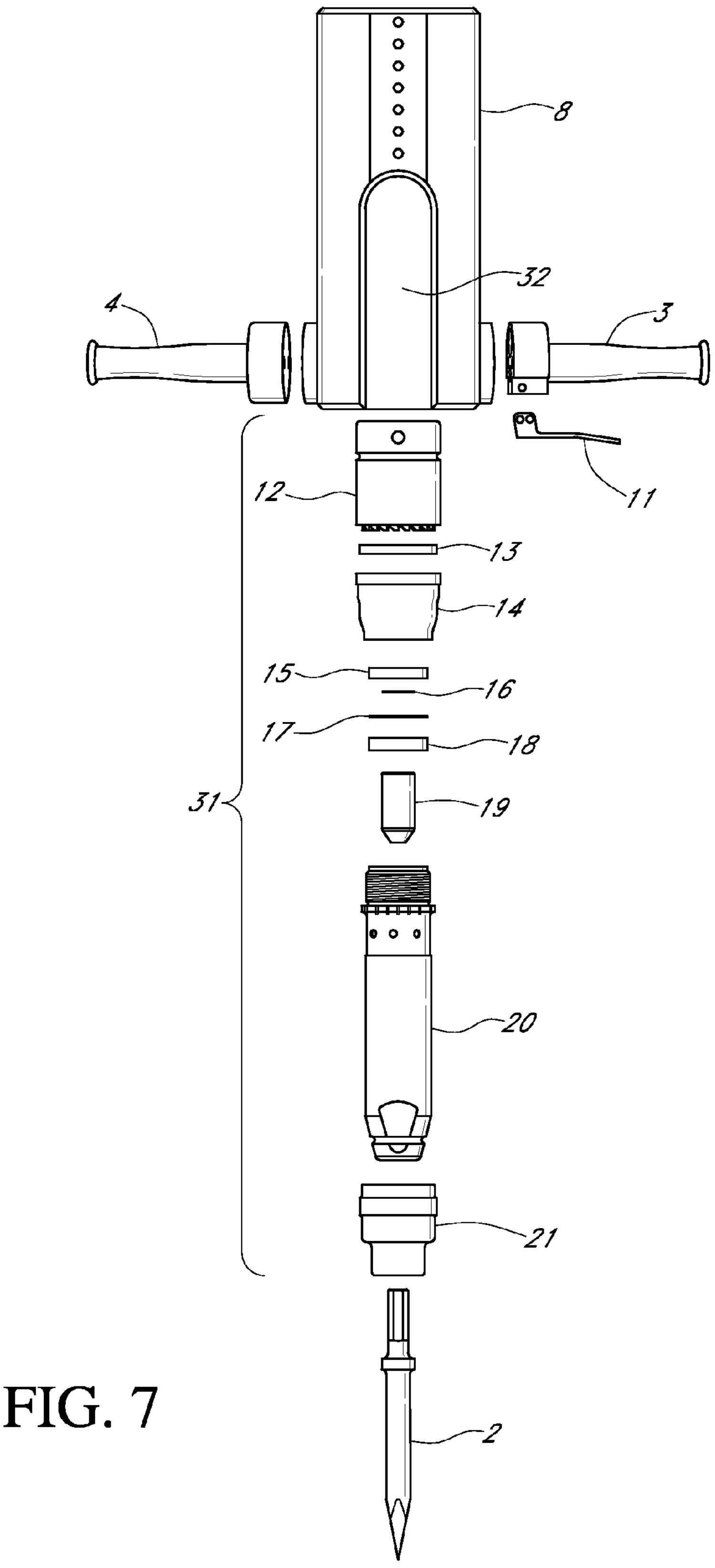
FIG. 7 provides an exploded view of the exemplary embodiment shown in FIG. 1.

The internal portion 9 may have several different embodiments, depending on the specific application for the power tool 1. In general, the internal portion 9 serves to convert electrical energy or potential energy (such as a compressed fluid) into mechanical energy, as is known to those skilled in the art. The internal portion 9 operatively communicates this mechanical energy to the work piece 2. A more detailed view of an internal portion 9 configured as a pneumatic percussive mechanism 31 is shown in FIG. 7, which is described in detail below and well known to those skilled in the art.

Figure 9:
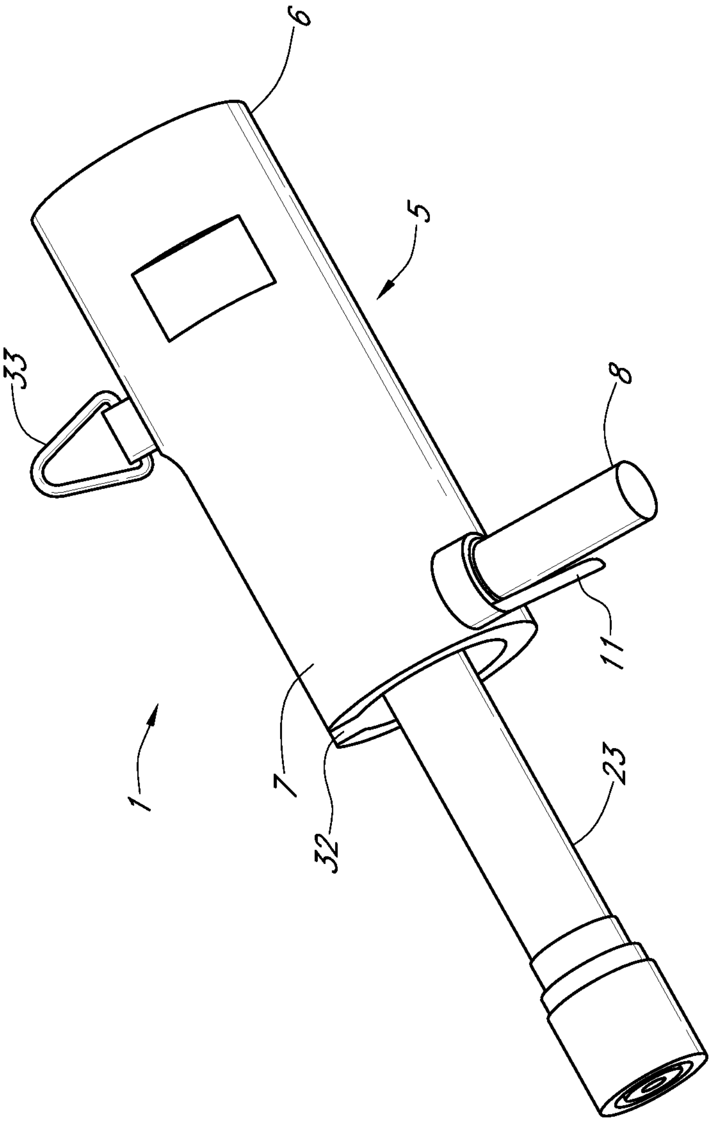
FIG. 9 provides a perspective view of a second embodiment of the power tool.

In an embodiment not shown herein, the internal portion 9 may also be configured as an electric percussive device (not shown), as is well known to those skilled in the art. In certain embodiments, the internal portion 9 includes a barrel 23 to which the work piece 2 is coupled. In one embodiment, the internal portion 9 and the barrel 23 are integrally formed. FIG. 9 shows an embodiment of the power tool 1 that includes a barrel 23 longer and more robust than the barrel 23 on the power tool 1 depicted in FIGS. 1-5. The power tool 1 is not limited by the specific size and/or dimensions of the barrel 23 or the internal portion 9, and embodiments different from those pictured and described herein are within the scope of the present disclosure. Generally, the size of the internal portion 9 and/or barrel 23 determines the application and capacity of the power tool 1.

As the size of the internal portion 9 and/or barrel 23 increases to accommodate a more forceful work piece 2, the size of the tool body 5 may increase by a corresponding amount. Accordingly, in certain applications the power tool 1 may be large enough so that supplemental supports are required during use. In those embodiments, the tool body 5 may be configured with a support ring 33 on the upper side so that the power tool 1 may be suspended by a chain or cable (See FIG. 5 by way of illustration). In this manner, the user 10 need not support the majority of the weight of the power tool 1. The support ring 33 may be mounted on a track (not shown) formed on the top of the tool body 5 so that it may be moved along the longitudinal axis of the power tool 1. In this way, the angle of the power tool 1 may be manipulated by the position of the support ring 33. The position of the support ring 33 in the track (not shown) may be secured through the use of set screws (not shown) engaging the tool body 5, or any other device known to those skilled in the art that is suitable for the specific application of the power tool 1.

As shown in FIGS. 1-5, the user interface portion of the power tool 1 is in a more convenient position than the position of the user interface portion of similarly functioning tools of the prior art. In the embodiments shown herein, the user interface portion consists of a first handle 3 and a second handle 4 positioned on the tool body 5 towards the work piece 2, which end of the tool body 5 is referred to herein as the tool body second end 7. In the embodiments pictured herein, the first and second handles 3, 4 are angled with respect to one another in such as way so that the angle between them is approximately 120 degrees. However, the angle between the first and second handles 3, 4 may be as great as 180 degrees (which would form a T-shape) or as little as 20 degrees, depending on the specific application.

A work piece 2 is in operative communication with the internal portion 9 of the power tool 1 through the retainer 21 (shown in FIG. 7). As is well known to those skilled in the art, the work piece 2 serves to communicate mechanical energy from the internal portion 9 and/or barrel 23 to the surface on which work is to be done. As used herein, the term "barrel" is meant to include the entire internal portion 9 that powers the power tool 1 and/or the portion of the power tool 1 protruding from the tool body 5. The power tool 1 may be employed with any type of work piece 2 necessary for a specific task, such as a chisel bit, a drill bit, hammer bit, or other type of work piece 2. Certain work pieces 2 may require a different coupling mechanism, and therefore may have a different type of barrel 23 on the internal portion 9 protruding from the tool body 5. As shown in FIG. 9, the power tool 1 may be configured to be used as a large reciprocating tool, commonly referred to as a "rivet buster." However, the power tool 1 may also be configured to be used as a medium or small reciprocating tool, commonly referred to as a "chipping hammer." Accordingly, the specific work piece 2 used or specific application of the power tool 1 in no way limits the scope of the present invention.

A throttle lever 11 is positioned on either the first or second handle 3, 4, and serves to activate the internal portion 9 to modulate mechanical energy transferred to the work piece 2 (explained in detail below). The throttle lever 11 may be positioned on either the first or the second handle 3, 4, and it may be positioned either towards or opposite the work piece 2 with respect to the user's position. It is contemplated the most convenient position of the throttle lever 11 will be towards the work piece 2, in which configuration the user 10 will engage the throttle lever 11 with the user's fingers.

In the embodiment of the power tool 1 pictured in FIGS. 1-5, the power tool 1 is pneumatically powered. FIG. 7 is an exploded view of the internal portion 9 and barrel 23 of the power tool 1. As shown, the power tool 1 has a throttle lever 11 attached to the first handle 3. The throttle lever 11 allows the user to control the flow of compressed fluid through a throttle valve 27 (shown in FIG. 8A) to engage the pneumatic motor 20 (which engages the pneumatic percussive mechanism 31) and vary the speed of operation of the power tool 1. The work piece 2 in this embodiment is a sharpened end that in combination with the pneumatic percussive mechanism 31 may drive the work piece 2 into and through solid material. The interior of the barrel 23 contains a typical pneumatic percussive mechanism 31 for a reciprocating the power tool 1, the rear inner end of which (i.e., the end adjacent the tool body first end 6) is chucked in the barrel 23 in conventional style by receiver cup 12 through the cooperative interaction of a clutch band 13, an exhaust shield 14, a valve seat 15, a valve 16, a washer 17, a top valve seat 18, a piston 19 and a retainer 21, which are well known to those of skill in the art. Other embodiments of the internal portion 9 and barrel 23 may be used within the spirit and scope of the present disclosure, and the embodiments thereof pictured and described herein are for exemplary purposes only. Those skilled in the art are well aware that in operation the power tool 1 is subject to a variety of forces, including fore-and-aft, vertical and lateral, and these occur at wide ranges of frequency and amplitude.

Figure 8A:
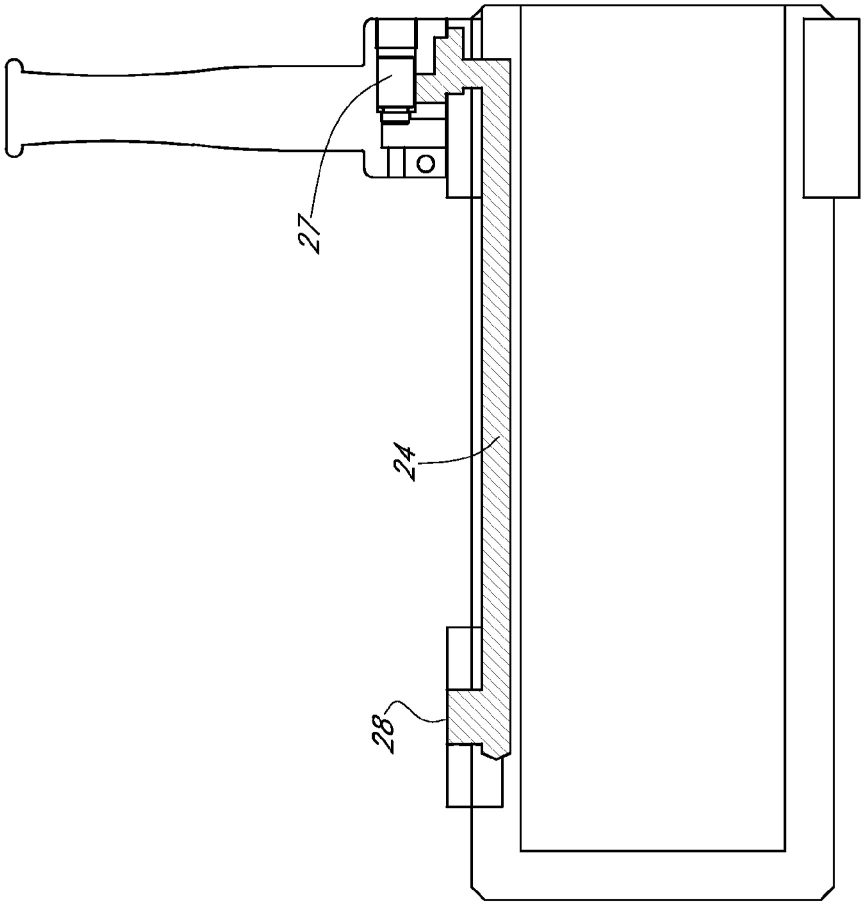
FIG. 8A provides a detailed view of the air feed system of the exemplary embodiment of the power tool.
Figure 8B:
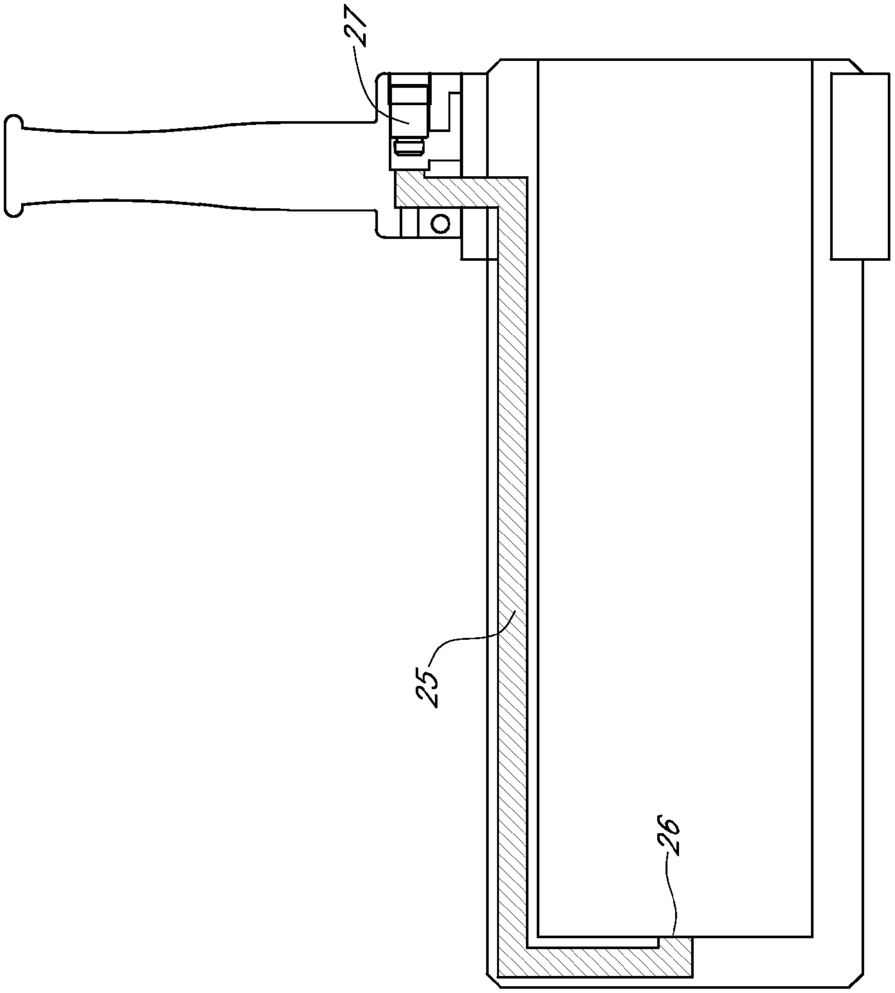
FIG. 8B provides a detailed view of the air delivery system of the exemplary embodiment of the power tool.

FIGS. 8A and 8B disclose and illustrate the compressed fluid supply necessary to motivate the embodiment of the power tool 1 that is pneumatically driven. The compressed fluid supply, which is commonly compressed air, is brought into the power tool 1 through the air inlet 28. The air inlet 28 is positioned towards the tool body first end 6 so as to not interfere with the user 10 during operation of the power tool 1. As illustrated in FIG. 8A, a first air passage 24 having an orientation that is substantially parallel with the longitudinal axis of the powered tool 1 and perpendicular to the longitudinal axis of the handles 3, 4 connects the air inlet 28 to the throttle valve 27 located adjacent first handle 3. The throttle valve 27 may be located adjacent the second handle 4 in an embodiment in which the throttle lever 11 is positioned adjacent the second handle 4.

As illustrated in FIG. 8B, a second air passage 25 also having an orientation that is substantially parallel with the longitudinal axis of the powered tool 1 and perpendicular to the longitudinal axis of the handles 3, 4 connects the throttle valve 27 to the tool feed 26. The second air passage 25 thereby serves as a conduit for the compressed fluid coming from the throttle valve 27 to the internal portion 9. The position of air inlet 28 and first and second air passages 24, 25 allows the compressed fluid supply for the power tool 1 to be located adjacent the tool body first end 6, which reduces interference between the user 10 and the power tool 1. The specific location of the air inlet 28 and first and second air passages 24, 25 may vary depending on the particular application of the power tool 1, and the present disclosure applies to all orientations allowing the compressed fluid supply to be delivered to the internal portion 9 in a manner that reduces interference with the user 10 during operation.

In embodiments in which the internal portion 9 is comprised of an electric percussive mechanism (not shown), the positioning of the throttle lever 11 adjacent one of the handles 3, 4 towards the tool body second end 7 does not require air passages 24, 25 formed in the tool body 5. Instead, an electrical conduit (such as wire) is simply routed from the electrical current source to a regulator (not shown) or other device for varying the amperage and/or voltage supplied to the electrical percussive mechanism (not shown). The throttle lever 11 would control the position of the regulator (not shown) or other device, which would in turn be electrically connected to the electric percussive mechanism (not shown). Because the electric percussive mechanism used in conjunction with the power tool 1 as disclosed herein is well known to those skilled in the art, it will not be described or explained further for purposes of clarity.

Positioning the handles 3, 4 towards the tool body second end 7 rather than towards the tool body first end 6 offers several advantages. For example, if the handles 3, 4 are symmetrical about the longitudinal axis of the power tool (as depicted in the embodiments herein), the force transferred from the power tool 1 to the user 10 during operation of the power tool 1 is evenly distributed to both of the user's hands 22, which subsequently evenly transfers the force to the user's wrists, elbows, shoulders, and other anatomical structures. In power tools having only one handle, the force transferred from the power tool to the user is almost exclusively distributed on one side of the user's body. The proximity of the handles 3, 4 to the work piece 2 allow the user 2 to more accurately position the work piece 2 and provides the user 10 with more leverage in manipulating the position of the power tool 2 than a similar arrangement in which the handles 3, 4 were adjacent the tool body first end 6.

The symmetry of the handles 3, 4 provided by the embodiments pictured herein also facilitates increased accuracy when operating the power tool 1 by allowing the user 10 a line of sight along the longitudinal axis of the work piece 2, which is enhanced in embodiments configured with a sight line 32 in the tool body 5. FIG. 4 shows a view of the power tool 1 and work piece 2 available to the user of the power tool 1. Although the embodiments pictured herein employ a symmetrical orientation of the handles 3, 4, the present invention is not limited to symmetrical orientations. Rather, the present invention includes any orientation of the handles 3, 4 on the tool body 5 where the handles 3, 4 are placed closer to the tool body second end 7 than they are to the tool body first end 6.

Furthermore, in embodiments not shown herein, the handles 3, 4 could be formed as one continuous piece connected to the tool body 5 at a plurality of positions. Such an embodiment may be oriented and fashioned to appear similar to the embodiments pictured herein with a member connecting the handle distal ends 8. This could be accomplished by a flat band (not shown) configured to engage the outer periphery of the tool body 5 and capable of engaging the tool body 5 so that the flat band (not shown) was not movable with respect to the tool body 5. In embodiments in which the handles 3, 4, are formed as one continuous piece, the handles 3, 4 may be affixed to the tool body 5 at more than two points to increase the durability of the handles 3, 4.

User comfort is another advantage of placing the handles 3, 4 towards the tool body second end 7, which is amplified by a symmetrical orientation of the handles, 3, 4. However, a symmetrical orientation of the handles 3, 4 is not required to realize the benefits of placing the handles 3, 4 towards the tool body second end 7, which is explained in detail above. As previously explained, when the user's wrist, elbow, and/or shoulder are required to act as a conduit for the force transferred from the power tool 1 to the user, undue stress is placed on ligaments, muscles, bones, tendons, and/or any other relevant anatomical tissue in the user's arm. By contrast, when the user 10 is allowed to position the user's arms in a straighter position (i.e., with the user's arms extended in front of the user's body away from the user's chest), as allowed by the present invention, the user's wrists, elbows, and shoulders serve to uniformly absorb and disperse a portion of the force created by the power tool 1.

Apart from advantages associated with a symmetrical orientation of the handles 3, 4, positioning the handles 3, 4 towards the tool body second end 7 allows the user 10 to correctly position the work piece 2 and use the power tool 1 without the need for the user to position the user's wrist, elbow, and/or shoulder in an extreme position. Furthermore, with the incorporation of a support ring 33, the present invention also decreases the user's workload avoiding user muscle fatigue and exhaustion.

The present invention includes many alternative embodiments of varying size and orientation. The internal portion 9, barrel 23, and/or tool body 5 are often sized according to the application of the power tool 1, depending on the force the power tool 1 is required to deliver. Furthermore, depending on the application for which the power tool 1 is designed, the tool body 5, work piece 2, and handles 3, 4 may be able to withstand forces of varying magnitude. Accordingly, the size of the power tool 1 or any elements thereof, the durability of the materials used to construct the power tool 1 or work piece 2, and the maximum force the power tool 1 is designed deliver in no way limit the scope of the present invention. Furthermore, and suitable material known to those skilled in the art, including metals, polymers, and/or composite materials, may be used to construct the power tool 1 or any portions thereof for any embodiment described or pictured herein.

The power tool 1 is not limited by the specific embodiments pictured or described herein, or the specific work piece 2 the power tool 1 is fashioned to engage. The present invention may be applied to any tool as determined by the needs of the user according to the specific application. Additionally, the scope of the present invention is not limited by whether the handles 3, 4 of the specific embodiment are oriented symmetrically along the longitudinal axis of the work piece 2, or the specific angle formed between the handles 3, 4. The present invention is intended to apply to all similar apparatuses for reducing or more evenly distributing the force transferred to a user 10 of the power tool 1 during operation of a power tool 1. Modifications and alterations from the described embodiments will occur to those skilled in the art without departure from the spirit and scope of the present invention.

The invention claimed is:

1. A pneumatic power tool comprising:

a. a tool body having first and second ends, wherein said tool body includes a cavity extending along the longitudinal axis of said tool body;

b. a pneumatic percussive mechanism, wherein said pneumatic percussive mechanism fits into a portion of said cavity;

c. a first handle affixed to said tool body second end;

d. a second handle affixed to said tool body second end, wherein said second handle is offset from said first handle around the periphery of said tool body;

e. a throttle lever mounted to one of said handles;

f. an air inlet formed in said tool body first end, wherein said air inlet is configured to receive a pressurized fluid capable of powering said pneumatic percussive mechanism;

g. a first air passage formed in said tool body, wherein said first air passage is in fluid communication with said air inlet, and wherein said first air passage extends from said tool body first end to said tool body second end;

h. a throttle valve positioned adjacent said throttle lever, wherein said throttle valve is in fluid communication with said first air passage;

i. a second air passage formed in said tool body, wherein said second air passage is in fluid communication with said throttle valve, and wherein said second air passage extends from said tool body second end to said tool body first end;

j. a tool feed formed in said tool body first end, wherein said tool feed is in fluid communication with said second air passage and said pneumatic percussive mechanism;

k. a track, wherein said track is formed on a portion of the exterior of said tool body along the longitudinal axis thereof;

l. a support ring, wherein said support ring is slidably engaged with said track; and, m. a work piece operatively coupled to said pneumatic percussive mechanism, wherein said work piece is located adjacent said tool body second end.

2. The pneumatic power tool according to claim 1 further comprising a sight line, wherein said sight line is formed along the longitudinal axis of said power tool.

3. The pneumatic power tool according to claim 1 wherein said throttle lever is further defined as being pivotally mounted to said first handle.

4. The pneumatic power tool according to claim 3 wherein said throttle lever is further defined as facing said tool body second end.

5. The pneumatic power tool according to claim 1 wherein said throttle lever is further defined as being pivotally mounted to said second handle.

6. The pneumatic power tool according to claim 1 wherein said handles are further defined as being symmetrically mounted about the exterior of said tool body with an angle of 120 degrees between said handles.

7. The pneumatic power tool according to claim 1 wherein said handles are further defined as being symmetrically mounted about the exterior of said tool body with an angle of 180 degrees between said handles.

8. The pneumatic power tool according to claim 1 wherein said handles are further defined as being symmetrically mounted about the exterior of said tool body with an angle between 90 and 180 degrees between said handles.

9. The pneumatic power tool according to claim 1 wherein said handles are further defined as being mounted along the longitudinal axis of said tool body halfway between said tool body first end and said tool body second end.

10. The pneumatic power tool according to claim 1 wherein said handles are further defined as being integrally formed with said tool body.

11. The pneumatic power tool according to claim 1 wherein said handles are further defined as being bound around the exterior of said tool body with a flat band engaging a portion of the periphery of said tool body.

* * * * *